United States Patent

Ottesen

[11] Patent Number: 6,049,441
[45] Date of Patent: Apr. 11, 2000

[54] METHOD AND APPARATUS FOR REAL-TIME FILTERING OF A POSITION ERROR SIGNAL FOR A DISK DRIVE SERVO SYSTEM

[75] Inventor: Hal Hjalmar Ottesen, Rochester, Minn.

[73] Assignee: International Business Machines Corporation, Armonk, N.Y.

[21] Appl. No.: 09/235,718

[22] Filed: Jan. 22, 1999

Related U.S. Application Data

[62] Division of application No. 08/766,919, Dec. 13, 1996, Pat. No. 5,875,066.

[51] Int. Cl.$^7$ .................................................. G11B 5/596
[52] U.S. Cl. .................................... 360/77.04; 360/77.08
[58] Field of Search ........................... 360/77.02, 77.04, 360/78.07, 77.08

[56] References Cited

U.S. PATENT DOCUMENTS

| | | | |
|---|---|---|---|
| 4,380,034 | 4/1983 | Krake | 360/77.02 |
| 4,412,165 | 10/1983 | Case et al. | 360/77.04 |
| 4,536,809 | 8/1985 | Sidman | 360/77.04 |
| 4,594,622 | 6/1986 | Wallis | 360/77.04 |
| 4,616,276 | 10/1986 | Workman | 360/77.04 |
| 4,785,442 | 11/1988 | Ohtake et al. | 369/44 |
| 4,982,297 | 1/1991 | Tsujisawa | 360/77.08 |

FOREIGN PATENT DOCUMENTS 60-143441  7/1985  Japan .

OTHER PUBLICATIONS

IBM Technical Disclosure Bulletin, vol. 29, No. 12, May 1987, pp. 5239–5240.

Commonly assigned U.S. application, No. 08/443,963, filed May 18, 1995, which is a continuation of U.S. application, No. 08/112,408, filed Aug. 26, 1993, entitled "Method and Apparatus of Rotary Actuator Arc Compensation Correction in a Direct Access Storage Device" (now U.S. Patent 5,854, 722).

*Primary Examiner*—W. R. Young
*Assistant Examiner*—Dan I. Davidson
*Attorney, Agent, or Firm*—Matthew J. Bussan

[57] ABSTRACT

A method and apparatus for real-time filtering of a position error signal in a servo system of a disk drive. Pre-calculated periodic components of the position error signal (PES) are used as future values in a real-time filter, preferably a real-time recursive median filter. This minimizes the amount of time-lag between obtaining the raw PES measurement from the disk surface and the providing the corresponding filtered PES output. This reduced time-lag minimizes the effect on the phase margin (PM) and results in improved servo stability. The invention can be used not only in servo systems in disk drives, but also in servo systems of other mechanical moving storage devices and in servo systems of rotating mechanical machinery in general, where the signal to be filtered may be a position error, velocity error, acceleration error, and the like.

2 Claims, 10 Drawing Sheets

METHOD AND APPARATUS FOR REAL-TIME FILTERING OF A POSITION ERROR SIGNAL FOR A DISK DRIVE SERVO SYSTEM

CROSS-REFERENCE TO RELATED APPLICATIONS

This application is a divisional of U.S. Ser. No. 08/766,919, filed on Dec. 13, 1996, by Hal H. Ottesen, and entitled "Method and Apparatus for Real-Time Filtering of a Position Error Signal for a Disk Drive Servo System", which application is incorporated by reference herein, now U.S. Pat. No. 5,875,066.

BACKGROUND OF THE INVENTION

1. Field of the Invention

The invention relates generally to a method and apparatus for real-time filtering of position error signals (PES) in disk drive servo systems that minimizes the time delay shift between the raw position error signal and the filtered output.

2. Description of the Prior Art

Computers often include mechanical moving storage devices, e.g., disk or tape drive units, having media on which data can be written and from which data can be read for later use. Disk drive units that incorporate stacked, commonly rotated, rigid magnetic disks are used for storage of data in magnetic form on the disk surfaces. Data is recorded in concentric, radially spaced data information tracks arrayed on the surfaces on the disks. Transducer heads driven in a path toward and away from the drive axis write data to the disks and read data from the disks.

All disk drive units must have a method to position each transducer head over the proper radial location to write a track and again, to position it very close to the same location to read the track. With the higher level performance disk drive units, e.g., those that use a voice coil type of actuator, a feedback mechanism must be provided to locate and stably hold the head on a given track. Typically, track accessing and track following are provided utilizing a magnetically pre-written pattern on the disk surfaces in the disk drive unit. A dedicated servo system employs only one surface of one of the disks in the disk drive on which is pre-written all the magnetic servo patterns used for position error information required by the tracking and track accessing servo. A sector servo system, in contrast, uses small portions (typically, 10–15%) of each of the data surfaces for magnetically pre-written servo patterns. These servo patterns are written on the disk surfaces within even-spaced radial servo sectors that are interlaced with data sectors. The radial servo sectors provide tracking and track access information for all concentric data tracks written on the particular disk surface. A hybrid servo system uses both dedicated servo and sector servo to obtain the advantages of each type of servo system.

Precise tracking and fast accessing of the transducing heads to any track are crucial to high performance disk drives. These requirements call for a closed loop servo system that has high degree of servo stability. A high degree of servo stability means that the radial motions of the transducing heads are smooth and not jerky, so that the transducing heads do not waver back and forth. In a similar situation, an automobile with worn shock absorbers will waver up and down when the wheels hit a bump on the road surface making steeling difficult, while an automobile with very stiff shock absorbers will transmit the shock of the bump to the driver making the drive harsh. An automobile with a high degree of servo stability, on the other hand, strikes a balance between the two extremes. One measure of servo stability is the phase margin (PM). The PM may be defined as a measure of the additional phase lag or time delay that can be tolerated in the servo loop before instability results. Servo instability in a disk drive is a catastrophic event. It will cause the transducing heads to waver radially back and forth with increasing amplitudes on the disk surface until the disk drive eventually self-destructs.

The servo system controlling the tracking and accessing of the transducing heads in disk drives uses a position error signal (PES) obtained by decoding prerecorded magnetic servo patterns on the disk surfaces. Noise in the decoded PES is a common problem in disk drives as disclosed in U.S. Pat. No. 4,412,165, issued to Case et al. One noise reduction method using common averaging provided by an analog linear filter is discussed in U.S. Pat. No. 4,380,034, issued to Krake. U.S. Pat. No. 4,982,297, issued to Tsujisawa, uses a real-time linear recursive digital filtering method for compensating for erroneous detection of PES. Real-time digital recursive filters, such as that used on the Tsujisawa patent, derive the next output from a linear, weighted sum of previously stored filter input values and output values.

Another technique for removing noise from the PES is simply to "ignore" PES samples that seem to be erroneous. Rather than utilizing a real-time linear filter that repetitively averages the last M position error signal (PES) samples, a real-time M-point median filtering method may be used. Here, the value M is typically a small odd integer. A real-time M-point median filter is a nonlinear filter that will pick the middle value from the last M samples. For example, the middle or median value of the last three PES samples could be extracted using a real-time 3-point median filter. A median filter is a nonlinear filter that will pick the middle value from an odd number of samples. The use of a real-time median filter in connection with the position error signal (PES) in disk drives has been disclosed in T. Makansi, "Median Filtering of Position Error Signals in a Data Recording Disk File," *IBM Technical Disclosure Bulletin*, Vol. 29, No. 12, May 1987, pp. 5239–5240. However, the Makansi disclosure only teaches finding the median of three or more sampled values of past PES measurement values. Any real-time filter used in a closed loop servo system, no matter whether linear (such as those disclosed in the Krake and Tsujisawa patents discussed in the previous paragraph) or nonlinear (such as that disclosed in the Makansi patent), that uses only past PES measurement values as inputs in the filtering operation adversely decreases the phase margin (PM). This occurs because an additional time lag is added to the servo system, and the servo tracking system is therefore subject to reduced stability.

Other methods for improving the tracking capability of servo systems in the presence of PES noise, e.g., caused by disk runout and the like, include the use of feedforward techniques in the disk drive servo. The basis for such feedforward techniques is that a variable portion of the dynamic PES can be anticipated. Thus, near term future behavior of the PES can be predicted with some accuracy. The PES is considered to consist of two components, the repeatable or periodic PES and the non-repeatable or non-periodic PES, being synchronous or non-synchronous with the disk rotation, respectively. The PES samples for a given track on each disk surface are averaged per sector over several revolutions of the disk pack. The resultant averaged PES samples, often referred to as the repeatable PES, are used by the servo system to anticipate synchronous motions of the head. The non-repeatable PES is obtained by subtracting the "raw" PES from the repeatable PES. U.S. Pat. No. 4,412,165 issued to Case et al.; U.S. Pat. No. 4,536,809 issued to Sidman; U.S. Pat. No. 4,594,622 issued to Wallis; and U.S. Pat. No. 4,616,276 issued to Workman, teach various algorithmic methods of deriving feedforward signals in connection with disk drives.

The problem with all of the prior art discussed above is that it does not provide an effective PES noise reduction method that has minimal impact on the required servo tracking stability. All noise filtering methods that use only past samples of the PES will adversely reduce the phase margin, and thereby reduce servo stability and cause poor tracking.

SUMMARY OF THE INVENTION

In view of the foregoing, an objective of the invention is to provide a mechanical moving storage device having enhanced filtering of the position error signal (PES).

Another objective is to provide effective real-time filtering of the position error signal (PES) noise without significantly reducing the servo phase margin and thereby the servo stability. Accordingly, track following and track seeking accuracy can be improved, and the maximum attainable data track density in the disk drive can be increased.

These and other objects of the invention are achieved by a method and apparatus that, in connection with a servo system of a disk drive, uses pre-calculated periodic components of the position error signal (PES) as future values in a real-time filter, preferably a real-time recursive median filter. This minimizes the amount of time-lag between obtaining the raw PES measurement from the disk surface and the providing the corresponding filtered PES output. This reduced time-lag minimizes the effect on the phase margin (PM) and results in improved servo stability. The invention can be used not only in servo systems in disk drives, but also in servo systems of other mechanical moving storage devices and in servo systems of rotating mechanical machinery in general, where the signal to be filtered may be a position error, velocity error, acceleration error, and the like.

BRIEF DESCRIPTION OF THE DRAWINGS

The invention together with the above and other objects and advantages may best be understood from the following detailed description of the preferred embodiments of the invention illustrated in the drawings. In the drawings, like reference numerals depict like elements.

FIG. 5A is a simulated instantaneous sampled PES for one complete revolution of the disk. FIG. 5B shows a simulated effect of sampling the PES with a conventional linear filter. FIG. 5C illustrates an improved filtered output obtained with a real-time (causal) non-recursive median filter according to an embodiment of the invention through simulation of an output of a non-real-time (non-causal) non-recursive median filter. FIG. 5D illustrates a further improved filtered output obtained with a real-time (causal) recursive median filter according to an embodiment of the invention through simulation of an output of a non-real-time (non-causal) recursive median filter.

DESCRIPTION OF THE PREFERRED EMBODIMENTS

Embodiments of the invention are described below with reference to the accompanying drawings.

Figure 1:
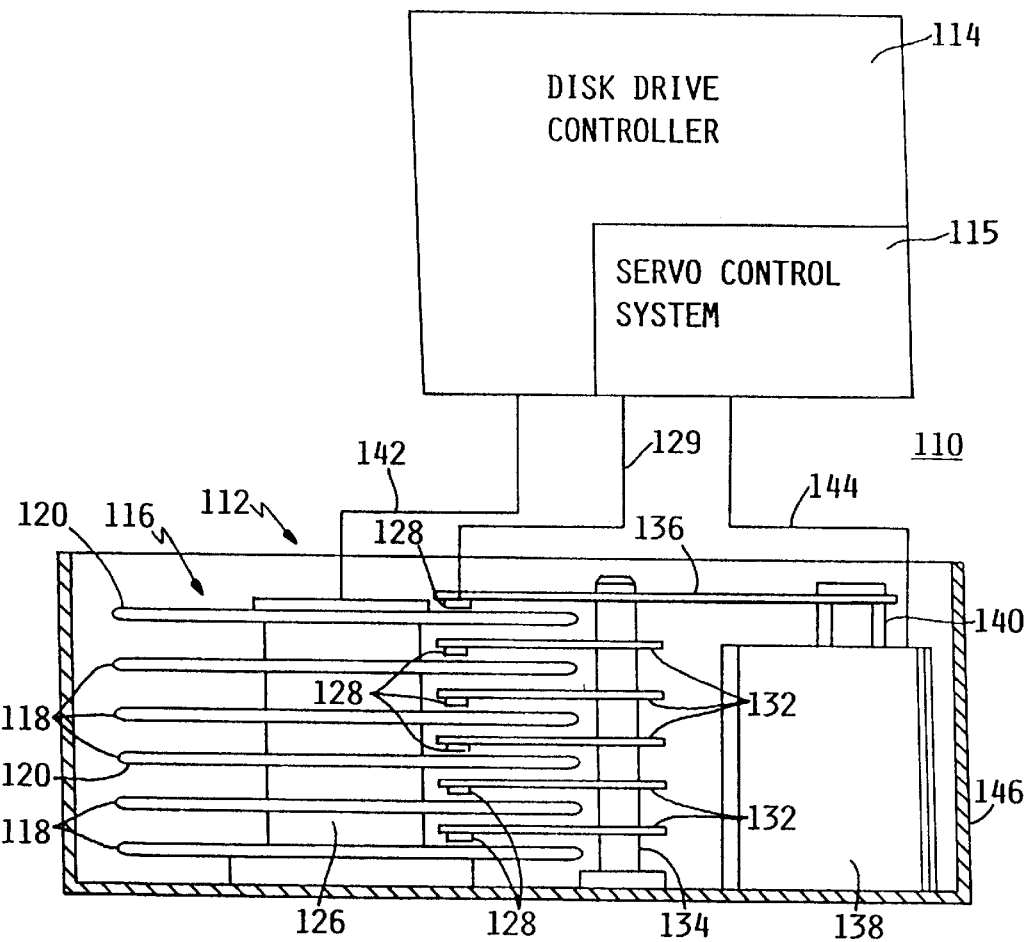
FIG. 1 is a schematic and block diagram of a data storage disk drive according to an embodiment of the invention.

In FIG. 1, a data storage disk drive system 110 according to an embodiment of the invention is shown including a hard disk drive 112 and a disk drive controller 114. The hard disk drive 112 is shown in simplified form sufficient for an understanding of the invention because the utility of the invention is not limited to the particular device used. In the embodiments, the data storage medium is a rigid magnetic disk. The invention, however, may be used in servo systems of mechanical moving storage devices employing other data storage media, such as floppy diskettes, tape, compact disks (CD or CD-ROM) and the like, and in servo systems of rotating mechanical machinery, where the signal to be filtered may be a position error, velocity error, acceleration error, and the like.

Figure 2A:
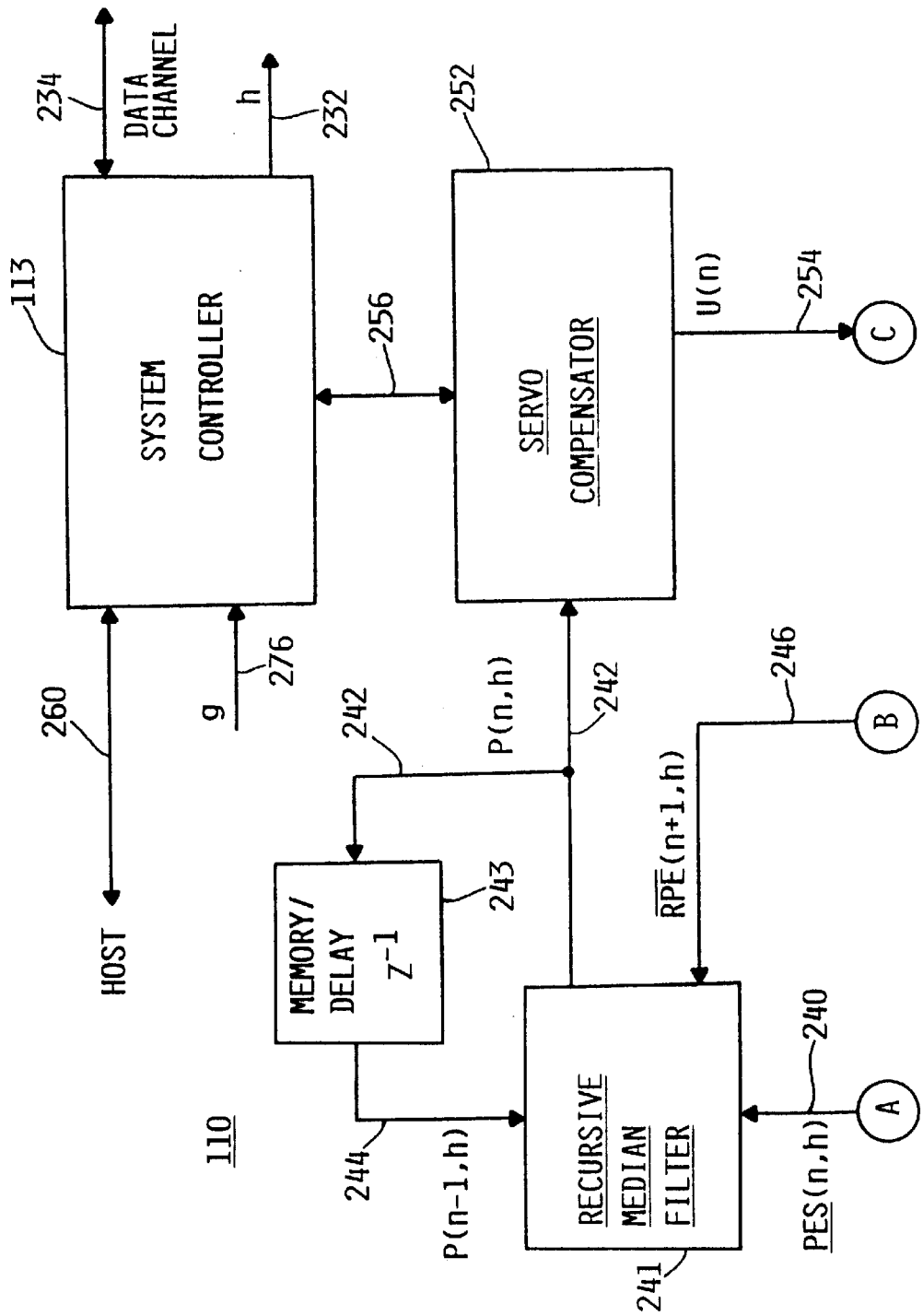
FIG. 2A–2B show a schematic and block diagram showing details of the servo control system of the disk drive controller of the data storage disk drive shown in FIG. 1.
Figure 2B:
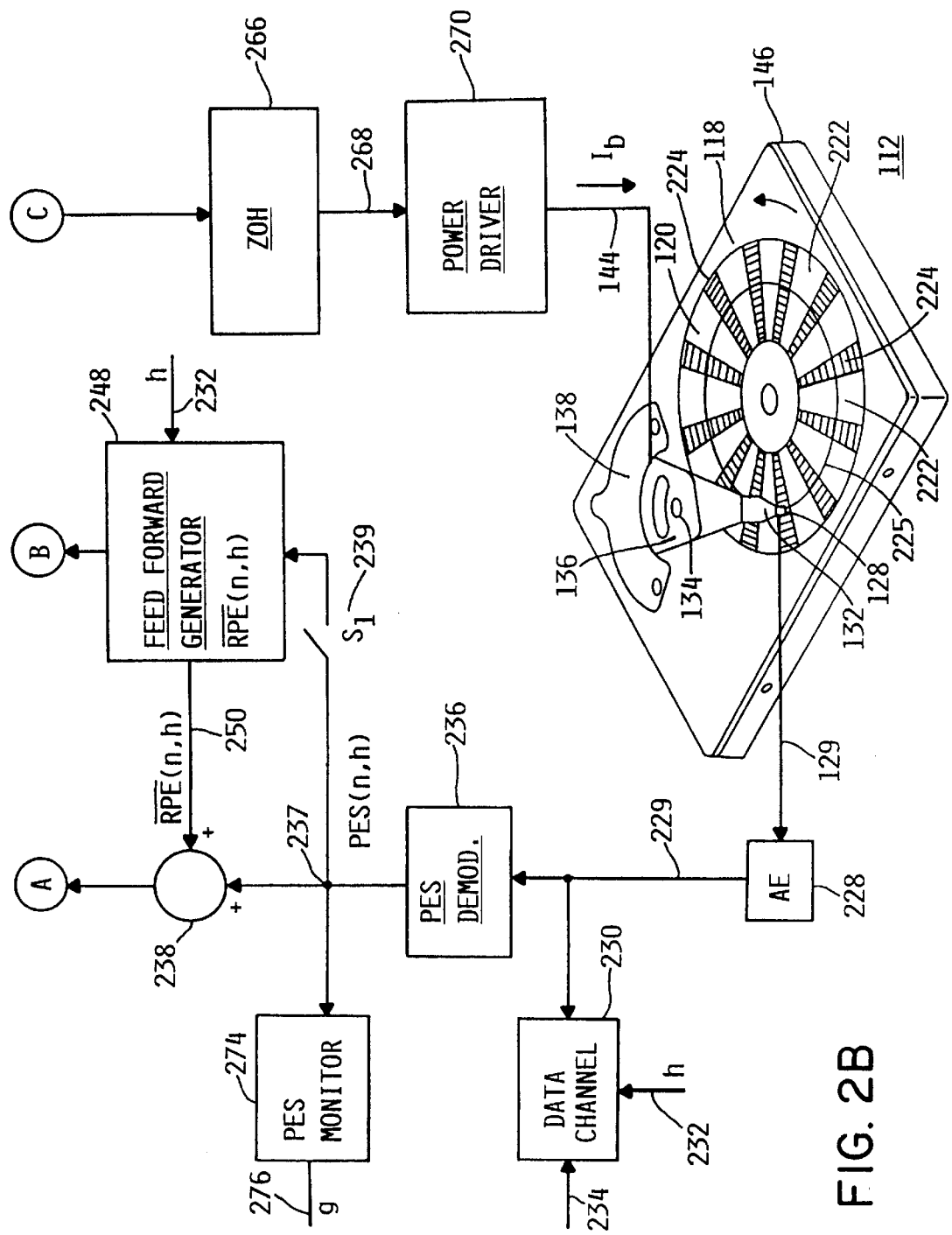

Referring now to FIGS. 1 and 2, the hard disk drive 112 includes a disk stack spindle 116 of disks 118, each having at least one magnetically coated disk surface 120. The disks are mounted in parallel and centrally aligned for simultaneous rotation on and by a spindle motor assembly 126. Data information recorded on each magnetically coated disk surface 120 is read from and/or written to by a corresponding transducer head integrated into an aerodynamic slider 128. Transducer/sliders 128 are airborne because of the rapid rotation of the magnetically coated disk surfaces 120, and are moved in a radial arc across the magnetically coated disk surface 120 as discussed below. The recording transducer head used in transducer/slider 128 may be, for example, a thin-film read/write element, or a magnetoresistive read element with a thin-film write element. The transducers/sliders 128 are preferably connected via a multiplexer (not shown) to an arm-electronics (AE) module 228 through a line 129.

Again referring to both FIGS. 1 and 2, the transducers/slider 128 is mounted on flexible suspension carried by rigid arm of an actuator arm/suspension assembly 132. Several of the aim/suspension assemblies are ganged together for simultaneous pivotal movement about an actuator support spindle 134. An actuator voice coil motor (VCM) leverage arm 136 is driven in a pivotal motion by a voice coil motor (VCM) 138. A voice coil 140 in conjunction with magnets and an iron core (not shown) are operatively controlled for moving the flying transducer/sliders 128 synchronously in a radial arc over the surface of the fast spinning disk(s) 118 in order to position the transducers/sliders 128 in registration with a data information track 225 to be followed and to access one or more particular data sectors 222 on the data information track 225. The data sectors 222 are interlaced with prerecorded servo sectors 224 located on the magnetically coated disk surface 120. As the disk 118 is rotating underneath the transducers/sliders 128 on the data information track 225, the transducer head will alternately pick up information from data sectors 222 and servo sectors 224 many times per revolution of the disk 118.

Referring again to FIG. 1, the hard disk drive 112 is a modular unit including an enclosure or base casting 146. The various components of the data storage disk drive system 110 are controlled in operation by control signals generated by the disk drive controller 114, such as spindle motor control signals on a line 142 and position control signals on a line 144, in response to signals on the line 129 from the transducer heads embedded in the transducers/sliders 128. The disk drive controller 114 includes a servo control system 115, which according to this embodiment of the invention, generates the position control signals using pre-calculated periodic components of the position error signal (PES) as future values for input to a real-time recursive median filter.

FIG. 2 is a block and schematic diagram showing details of the servo control system 115 of the disk drive controller 114 of the data storage disk drive system 110 shown in FIG. 1. In FIG. 2, the hard disk drive 112 is shown stripped of many elements to promote better understanding. The servo control system 115, which is discussed in detail below, employs a disk drive servo control architecture commonly referred to as sector servo control or embedded servo control.

The actuator arm/suspension assembly 132 is shown in FIG. 2, along with the voice coil motor (VCM) leverage arm 136 and the actuator support spindle 134. FIG. 2 also shows the transducer/slider assembly 128 on the actuator aim/suspension assembly 132, a portion of the magnetic structure of the VCM 138, and the base casting 146 with its lid removed for clarity.

The magnetically coated disk surface 120 is prerecorded with servo patterns written circumferentially using the transducer head of the transducers/sliders 128 within many narrow radial sectors 224 (shown with crosshatching in FIG. 2). At the same linear recording density in high performance, high storage capacity disk drives, around the circumference of the disk there are typically about 90 servo sectors for the 3.5" form factor and about 60 servo sectors for the 2.5" form factor. The servo sectors 224 typically occupy about 10–15% of the magnetically coated disk surface 120. Preferably, the number of interlacing data sectors 222 equals that of the servo sectors 224. The transducer head detects the specially coded servo patterns in the servo sectors 224 as the prerecorded magnetically coated disk surface 120 spins at high speed underneath the transducer/slider 128. The servo signals from the transducer heads of the transducer/slider 128 are provided on the line 129 to an arm-electronics (AE) module 228. The amplified servo signals from the AE module 228 are outputted on a line 229, which is typically a flex cable, and decoded into a raw digital (sampled) position error signal PES(n, h) by a position error signal (PES) demodulator 236 each time the servo sector 224 passes underneath the transducer head of the transducer/slider 128. The PES demodulator 236 outputs the raw digital position error signal PES(n, h), where n is the servo sector index and h is the transducer head number. In general, n=1, 2, . . . , N, where N is the total number of servo sectors, and h=1, 2, . . ., H, where H is the total number of transducers/sliders 128 used by the data storage disk drive system 110.

The output from the AE module 228 on the line 229 is time multiplexed between the PES demodulator 236 and a data channel 230 that processes the data information selected from the hard disk drive 112. It can be seen from FIG. 2 that as the disk rotates, the signals picked up by the transducer head in transducer/slider 128 following the data track 225 will alternate between data information and servo information. As is conventional, the data channel 230 may change its static and dynamic characteristics depending on the disk/transducer characteristics which are adaptively controlled by a system controller 113 via a head select line 232 and a disk drive data/control bus 234. The data channel 230 transfers data to the system controller 113 via the disk drive data/control bus 234. After local processing in the system controller 113, the data is passed onto a host/disk drive interface bus 260.

As was mentioned above in the description of the prior art, it is conventional to use feedforward techniques in disk drive servo systems. The basis for such conventional feedforward techniques is that a variable portion of the dynamic PES can be anticipated. Thus, near term future behavior of the PES can be predicted with some degree of accuracy. The PES is considered to consist of two components, the repeatable or periodic PES and the non-repeatable or non-periodic PES, being synchronous or non-synchronous with the disk rotation, respectively. The PES samples for a given track on each disk surface are averaged per sector over several revolutions of the disk pack. The resultant averaged PES samples, often referred to as the repeatable PES, are then filtered (smoothed) and stored in memory for later use by the servo to anticipate synchronous motions of the head. It is conventional, that this process is repeated for each individual transducer head of each transducer/slider 128. The smoothed repeatable PES for head h is referred to as the feedforward signal $\overline{RPE}(n, h)$.

Again referring to FIG. 2, as is conventional, the raw position error signal PES(n, h) at a PES demodulator output 237 is summed to the feedforward signal $\overline{RPE}(n, h)$ on a line 250 in an adder 238 having an adder output line 240. According to this embodiment of the invention, a signal $\underline{PES}(n, h)$ on the adder output line 240 serves as one of the three inputs to a recursive median filter (RMF) 241. The RMF 241, which is discussed in detail below, is a 3-point RMF and provides as its output the recursive median filtered position error signal P(n, h), on a line 242 to a servo compensator 252. The servo compensator 252, which is discussed below, is typically a microprocessor that processes position information and outputs appropriate control signals. The RMF 241 has two other inputs—one is a delayed version of the recursive median filtered position error signal designated as P(n−1, h) and is provided by a memory/delay 243 on a line 244, and the other is the future repeatable position error $\overline{RPE}(n+1, h)$ obtained from a feedforward sequence generator 248 and is provided on a line 246. The feedforward sequence generator 248, which is discussed in detail below, preferably has adequate storage capacity for storing the repeatable position error $\overline{RPE}(n, h)$, n=1,2, . . . ,N and h=1,2, . . . , H for each of the total number N of servo sectors 224 for each of the total number H of transducer/sliders 128. The specific repeatable position error $\overline{RPE}(n, h)$ provided by the feedforward sequence generator 248 for head h is typically selected by the head select line 232. The repeatable position error $\overline{RPE}(n, h)$ is substantially constant, at least in the short term. It does not change much, for example, over relatively short time periods or as a function of the radius of the data track 225.

The servo compensator 252 is usually a microprocessor containing several conventional servo control algorithms, filtering algorithms, and the like. The servo compensator 252 is under the supervision of the system controller 113 via a servo compensator control bus 256. The servo compensator 252 provides an output 254 to a Zero-Order-Hold (ZOH) module 266. As is conventional, the digital value on the output 254 is converted from a digital signal to an analog signal in the ZOH module 266. The analog signal is outputted on a line 268, amplified and converted to a proportional control current by a power driver 270. The ZOH module 266 can be considered to be a digital-to-analog converter (DAC). Finally, the control current is supplied to the voice coil motor (VCM) 138 via an actuator position control signal line 144 to correctly adjust the position of the transducer/slider 128.

The use of the feedforward sequence generator 248 as an aid in actuator servo tracking for the correction of repeatable position error (RPE) has been used for some time in modern high performance disk drives. For example, commonly assigned U.S. patent application Ser. No. 08/443,963, filed May 18, 1995, which is a continuation of U.S. patent application Ser. No. 08/112,408, filed Aug. 26, 1993, entitled "Method and Apparatus of Rotary Actuator Arc Compensation Correction in a Direct Access Storage Device," teaches some of the modifications that can be applied to the feedforward correcting signal used with a rotary actuator in order to improve the tracking accuracy. It is known that radial movements or slips of one or more individual disks 118 with respect to the spindle motor assembly 126 occur temporarily and/or permanently. These disk motions cause eccentricity or runout with respect to a stationary held transducer/slider 128. Because track 225 is written on the rigid magnetically coated disk surface 120, the flying transducer/slider 128 will also see radial motions of the track 225 as the disk 118 is spinning underneath it.

The position error (PE) in the hard disk drive (HDD) may be decomposed (separated) into a repeatable position error (RPE, synchronous with disk rotation) and a non-repeatable position error (NRPE, asynchronous with disk rotation). For example, any PE noise introduced during the pre-writing of the servo sectors, including disk runout, mechanical resonances in the bearings associated with the spindle motor assembly 126 and aim/suspensions 134, and servo pattern deformities due to defects in the magnetic coating and/or disk surface, will contribute to the repeatable position error (RPE). Both RPE and NRPE are included in the measurement PES(n, h) for any track j in the disk drive at sector n and head h. The RPE computation, done as part of the initialization, utilizes the measured raw position error signal PES(n, h) with a switch 239 closed. In the case of a disk drive that has N servo sectors, the average sector position or repeatable position en-or RPE (n, h) taken over L consecutive revolutions of the disk at sector n and head h is given by $$RPE(n, h) = \frac{1}{L}\sum_{l=1}^{L} PES_l(n, h), \quad n = 1, 2, \ldots, N. \quad (1)$$

To obtain an even better estimate, the repeatable position error RPE (n, h) may be computed at several radial positions from measurements of PES (n, h) from each the magnetically coated disk surfaces 120. The multiple computed RPE (n, h) may be averaged in various ways for one or more concentric annular bands of the magnetically coated disk surfaces 120 and used by the feedforward generator 248. However, for simplicity and without limitation, we will consider that there is only one sequence RPE (n, h) per disk surface (assuming one head per surface) that is used by the feedforward sequence generator 248. The computed RPE (n, h) is quite stationary and the N computed values may be filtered by a lowpass filtering algorithm in the feedforward sequence generator 248 that extracts one or more of the lower harmonics of the sequence RPE(n, h) to produce a smoothed sequence $\overline{RPE}$(n, h). The smoothed sequence $\overline{RPE}$(n, h) is then stored in the feedforward generator 248. This process may be updated at regular intervals of disk drive operation with the switch ($S_1$) 239 closed. Under normal disk drive operation the switch ($S_1$) 239 is open.

The non-repeatable position error (NRPE) at sector n and head h is the difference between the measured PES(n, h) and the smoothed $\overline{RPE}$(n, h) as shown in Equation (2) below.

$$NRPE(n, h) = PES(n, h) - \overline{RPE}(n, h), \quad n=1, 2, \ldots, N \quad (2)$$

Referring now to FIG. 2, adding the predictable and smoothed repeatable $\overline{RPE}$(n, h) to the raw position error signal PES(n, h) in the adder 238 will cause the actuator servo compensator system to "automatically" follow the repeatable position error. This is referred to as "anticipated track runout following." Hence, the raw position error signal PES(n, h) measured at each servo sector will mostly contain the non-repeatable portion of the position error. This improves the servo tracking capability. The adder output 240 has a digital value $$\underline{PES}(n, h) = PES(n, h) + \overline{RPE}(n, h).$$

Median filters are nonlinear filters. As such, median filters can be used for reducing impulsive noise while maintaining the basic structure of the signal without smearing the signal. Linear filters, on the other hand, reduce impulsive noise by smoothing or averaging and will therefore cause smearing of the signals with impulsive noise. Assume that a sampled sequence x(n), where n is the sampling index, is to be processed by a 3-point median filter. This means that there is a moving window of length equal to three samples. The median filter algorithm, with output y(n), is typically given as $$y(n)=\mathrm{median}[x(n-1), x(n), x(n 30\ 1)]. \quad (3)$$

For example, consider the case where the sampled sequence is x(n)=. . . , 3,6,−20,4,100,5,5,4,2,10,5, . . . . The corresponding 3-point median filtered output would be y(n)=3, 3,4,4,5,5,5,4,4,5,5. It has been assumed here that the end elements of the sequence x(n) in Equation (3) are zero. For example, the three first elements of the sequence within the window are { 0,3,6} and its middle or median value is 3, the next three elements of x(n) are { 3,6,−20} and the median is 3, the next three elements of x(n) are {6,−20,4} and the median is 4, the next three elements of x(n) are {−20,4,100} and the median is 4, and so on. The median filter operation given in Equation (3) requires x(n+1) to be measured before the median filtered output y(n) can be computed. Thus, this filter cannot be used in real time. The median filter shown in Equation (3) is referred to as non-causal. The median filter operation can be made causal. A causal median filter algorithm is given in Equation (4) below.

$$y(n)=\mathrm{median}\ [x(n-2), x(n-1), x(n)] \quad (4)$$

This filter can be used for real-time operation, but the output y(n) is lagging the input signal x(n) by one sampling period. This situation is shown in FIG. 3.

Figure 3:
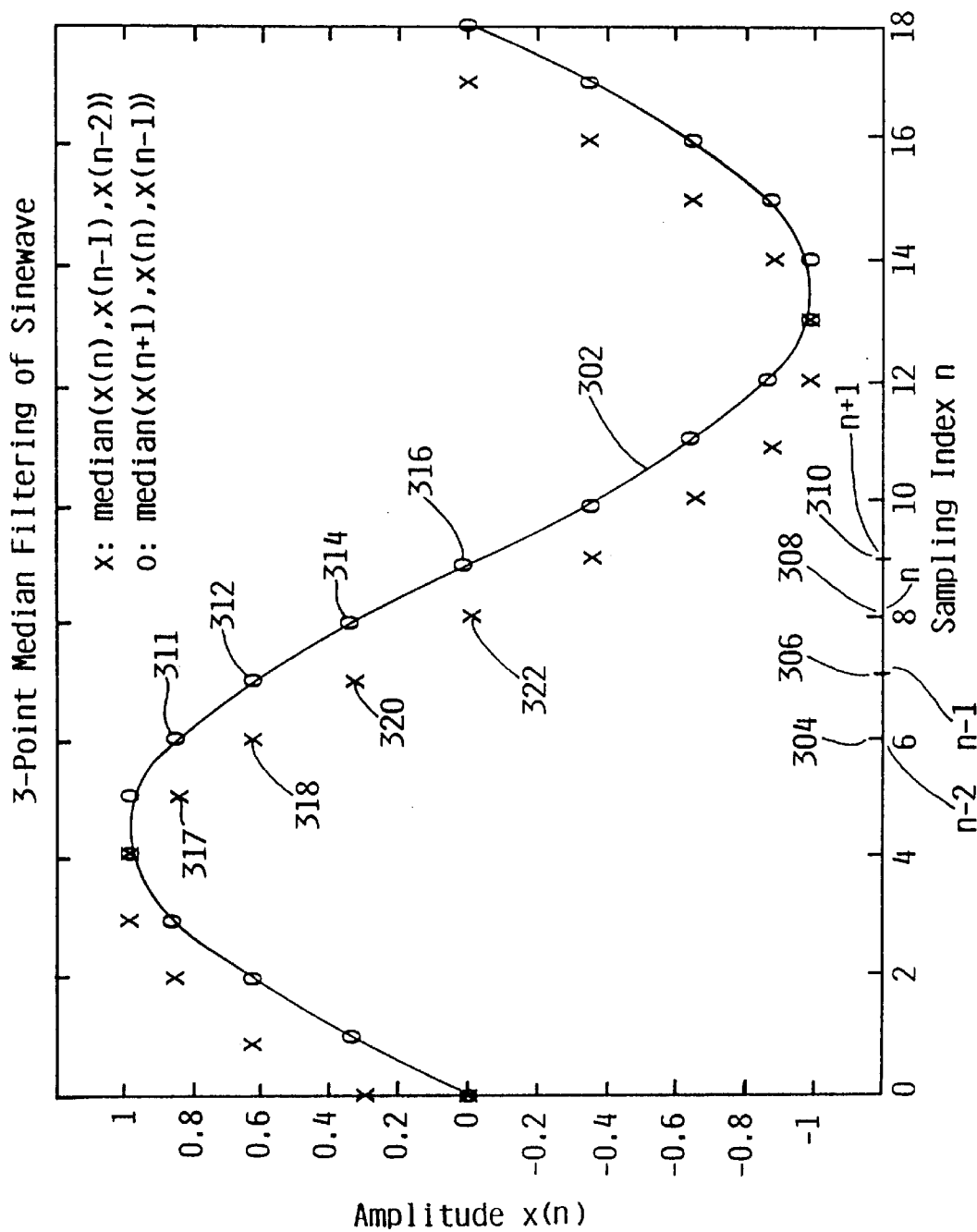
FIG. 3 is a graph illustrating a sampled sinusoidal signal and the lack of a phase shift in a median filter using, along with present and past samples, a future estimation of the sampled signal according to an embodiment of the invention. In contrast, a phase lag of one sampling period is caused by a median filter using only the present and past samples, but no future estimation of sampled values.

Referring to FIG. 3, an analog input signal x(t) 302, is sampled at regular intervals 304, 306, 308, and 310 to give x(n). Some of these samples, x(6) x(7), x(8), x(9) are shown as 311, 312, 314, 316, respectively and are marked as ○ in FIG. 3. The output y(n) from the non-causal median filter in Equation (3) is in this case the same as the input samples x(n), but more importantly there is no phase shift between the input samples x(n) and median output y(n). On the other hand, if the causal median filter in Equation (4) is used, then there is a phase shift of one sampling period between the input samples 311, 312, 314, 316, and median output values 317, 318, 320, 322 marked with × in FIG. 3. This phase shift is very detrimental to the servo stability of the actuator control system, due to a reduction of the phase margin.

As mentioned above in the description of the prior art, the phase margin (PM) is a measure of the additional phase lag or time delay that can be tolerated (in the servo loop) before instability results. The PM is used in connection with closed loop feedback systems and is a measure of the difference between 180° and the amount of phase lag in the servo loop where the servo loop gain is equal to unity. Referring now to FIG. 2, the contributing elements to the phase lag in the servo loop, besides the mechanical actuator dynamics, include the PES demodulator 236, the recursive median filter 241, the servo compensator 252, and the zero order hold (ZOH) module 266. Typically, the PM is about 35°–45° for a well-designed servo loop of a disk drive. If the PM is zero or negative and the servo loop gain is larger than unity, then the tracking servo loop will oscillate and render the disk drive totally useless. An oscillating tracking servo will also quickly destroy the disk drive. The PM is a function of frequency and will eventually become zero and then negative beyond some frequency $f_{PM}$. This is acceptable from a servo stability point of view as long as the servo loop gain is less than unity beyond the frequency $f_{PM}$, where PM=0. For example, if there are 90 servo sectors per revolution for a 3.5" disk drive, then one sector period or sampling period corresponds to a loss of 360°/90=4° from the phase margin at the rotational frequency. Similarly if there are 60 servo sectors per revolution for a 2.5" disk drive, then one sector period or sampling period corresponds to a phase margin loss of 360°/60=6° at the spindle rotational frequency. Hence for a given linear recording density, a reduction in the form factor will typically reduce the number of servo sectors and increase the detrimental phase lag. Increased position error signal PES(n, h) phase lag results in impaired tracking capabilities due to reduced servo stability. It therefore becomes essential for good servo tracking performance that the phase lag introduced by the components in the servo loop is minimized as much as possible.

Recursive median filters use previous median filtered outputs as part of the median selection process. A recursive median filter has better smoothing characteristics than a non-recursive median filter, such as the non-recursive 3-point median filter given in Equation (3). The non-causal (non-real-time) non-recursive 3-point median filter given in Equation (3) may be converted to a non-causal (non-real-time) recursive 3-point median filter by changing the algorithm in Equation (3) to $$y(n)=\text{median } [y(n-1), x(n), x(n+1)]. \quad (5)$$

In Equation (5) the 3-point filtered output sample y(n−1) is used in the median selection together with the present sample x(n) and a "future" sample x(n+1). Implementation of Equation (5) as a real time filter is impossible because of the "future" sample x(n+1). Similarly, the causal (real-time) non-recursive 3-point median filter given in Equation (4) may be converted to a causal (real-time) recursive 3-point median filter by changing the algorithm in Equation (4) to $$y(n)=\text{median } [y(n-2), y(n-1), x(n)]. \quad (6)$$

In a contradistinction to Equation (5), Equation (6) can be implemented as a real-time recursive median filter.

The filter length of median filters is preferably an odd number. If the length is an even number, then the median is typically picked as the average of the two median samples. The larger the filter length, the more lowpass filtering is being performed. The median filter may be considered a lowpass filter where the cutoff frequency is an inverse function of the filter length.

One of the most valuable properties of both recursive and non-recursive median filters is the ability to eliminate impulsive noise from a signal. Assuming an odd filter length, the ability of a median filter to eliminate successive impulses is related its filter length (2M+1), where M is an integer. Characteristic for a (2M+1)-point median filter is that it can eliminate up to M successive impulses, but if there are more than M successive impulses they will all pass unaltered through the filter. For example, a 3-point median filter can eliminate one isolated noise pulse. If there are two consecutive noise pulses, then the 3-point median filter will pass the two noise pulses without change. A 5-point median filter, however, will eliminate both an isolated impulse and two consecutive impulses. A 7-point median filter can eliminate single, double, and triple impulses, but cannot obliterate four consecutive impulses, and so on.

As mentioned above in the description of the prior art, the use of a real-time median filter in connection with the position error signal (PES) in disk drives has been disclosed in T. Makansi, "Median Selection of Position Error Signals in a Data Recording Disk File," *IBM Technical Disclosure Bulletin*, Vol. 29, No. 12, May 1987, pp. 5110–5240. This reference suggests the real-time use of a non-recursive, 3-point median filtering of the position error signal PES(n, h) using Equation (4). As can be seen from FIG. 3, this causes a phase shift (delay) of the position error signal PES(n, h) as indicated by samples 317, 318, 320, and 322, which results in a decreased phase margin (PM) and impaired actuator servo performance. Thus, the proposed solution in the Makansi disclosure would be inadequate for high performance disk drives.

According to this embodiment of the invention, a real-time implementation of Equation (5), or less preferably Equation (3), is approximated using the processed feedforward sample $\overline{RPE}(n+1, h)$ as a future sample. This is effective in cases where the sampled signal can be separated into a repeatable component and a non-repeatable component. It is especially effective in cases where there is a large repeatable component in the sampled signals.

Figure 4:
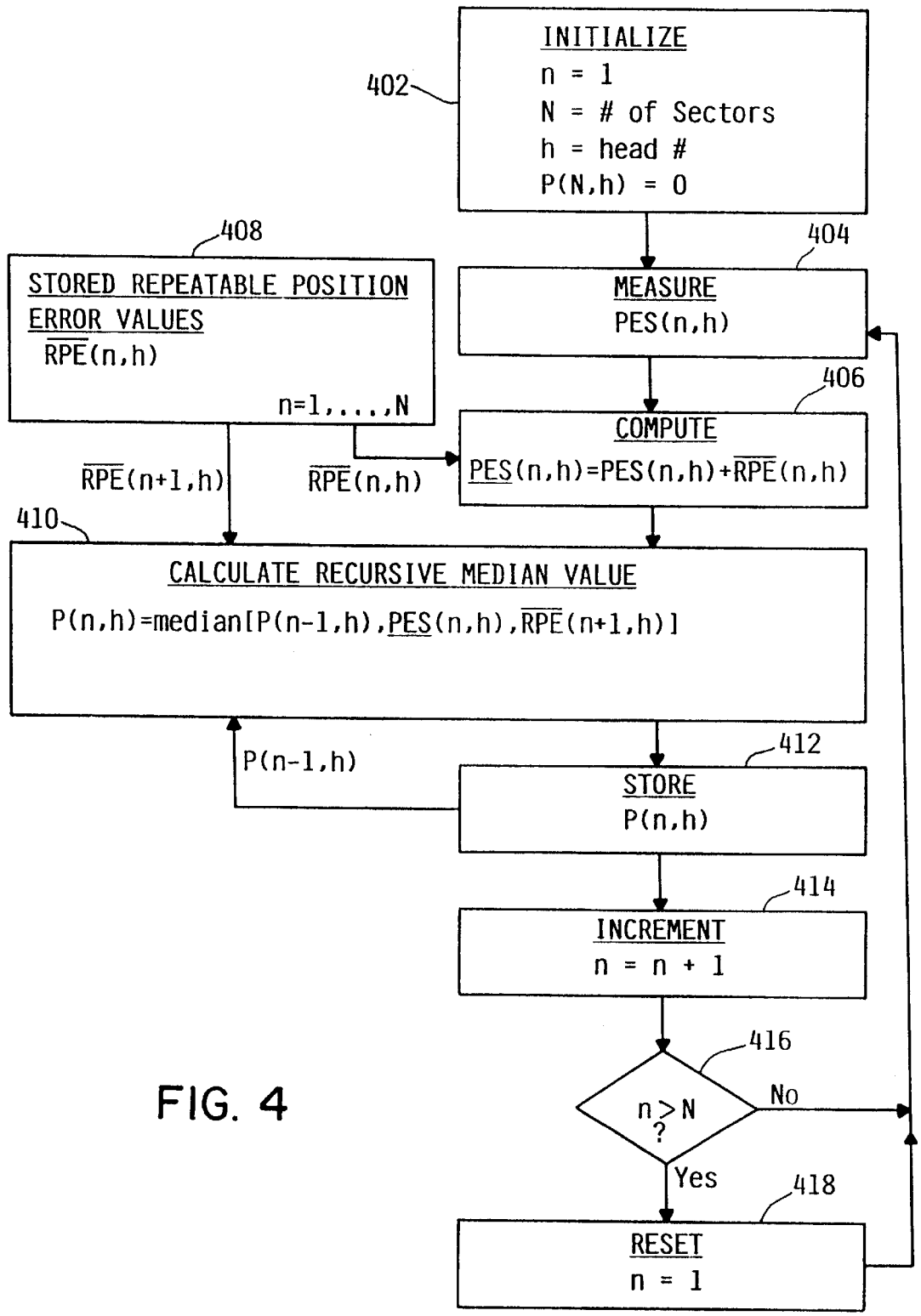
FIG. 4 is a flow chart wherein the filtered position error signal (PES) having zero amount of phase shift is computed using a real-time 3-point recursive median filter according to an embodiment of the invention.

Referring now to FIG. 4, in addition to FIG. 2, a method according to an embodiment of the invention will be described. FIG. 4 is a flow chart wherein the filtered position error signal (PES) having zero amount of phase shift is computed using the real-time 3-point recursive median filter (RMF) 241 shown in FIG. 2. Assume that head h has been selected and the actuator has accessed a certain track. The process starts in block 402 by initializing the process by setting n=1, N equal to the total number of servo sectors, h equal to the head number, and the "previous" 3-point recursive median filter value P(N, h)=0 for a cyclic modulo N(n=. . . N−1, N, 1, 2, . . . N−1, N, . . . ). In block 404, the position error signal PES(n, h) is measured. In block 406, the composite $\underline{PES}(n, h) = \overline{PES}(N, h) + RPE(n, h)$ is computed in adder 238. Then the 3-point recursive median filter output value P(n, h) is computed in block 410 from the algorithm $$P(n, h)=\text{median } [P(n-1, h), \underline{PES}(n, h), \overline{RPE}(n+1, h)], n=1,2,\ldots, (N) \quad (7)$$

where P(n−1, h) is the previous recursive median output for head h stored at block 412 in the memory/delay 243, and $\overline{RPE}$(n+1, h) is obtained in block 408 from the storage memory of the feedforward generator 248. The recursive median filter output value P(n, h) on the line 242 serves as input to the servo compensator 252. The recursive median filter output value P(n, h) is also stored at block 412 in the memory/delay 243 to be used in the 3-point median filtering of the next sample. The index n is incremented by one in block 414, and n is compared to the total number of servo sectors N in a decision block 416. If n≦N, then the process is repeated from block 404 without resetting n, and finally if n>N, then n is reset to 1 in block 418 and the process is repeated from the block 404.

Figure 5A:
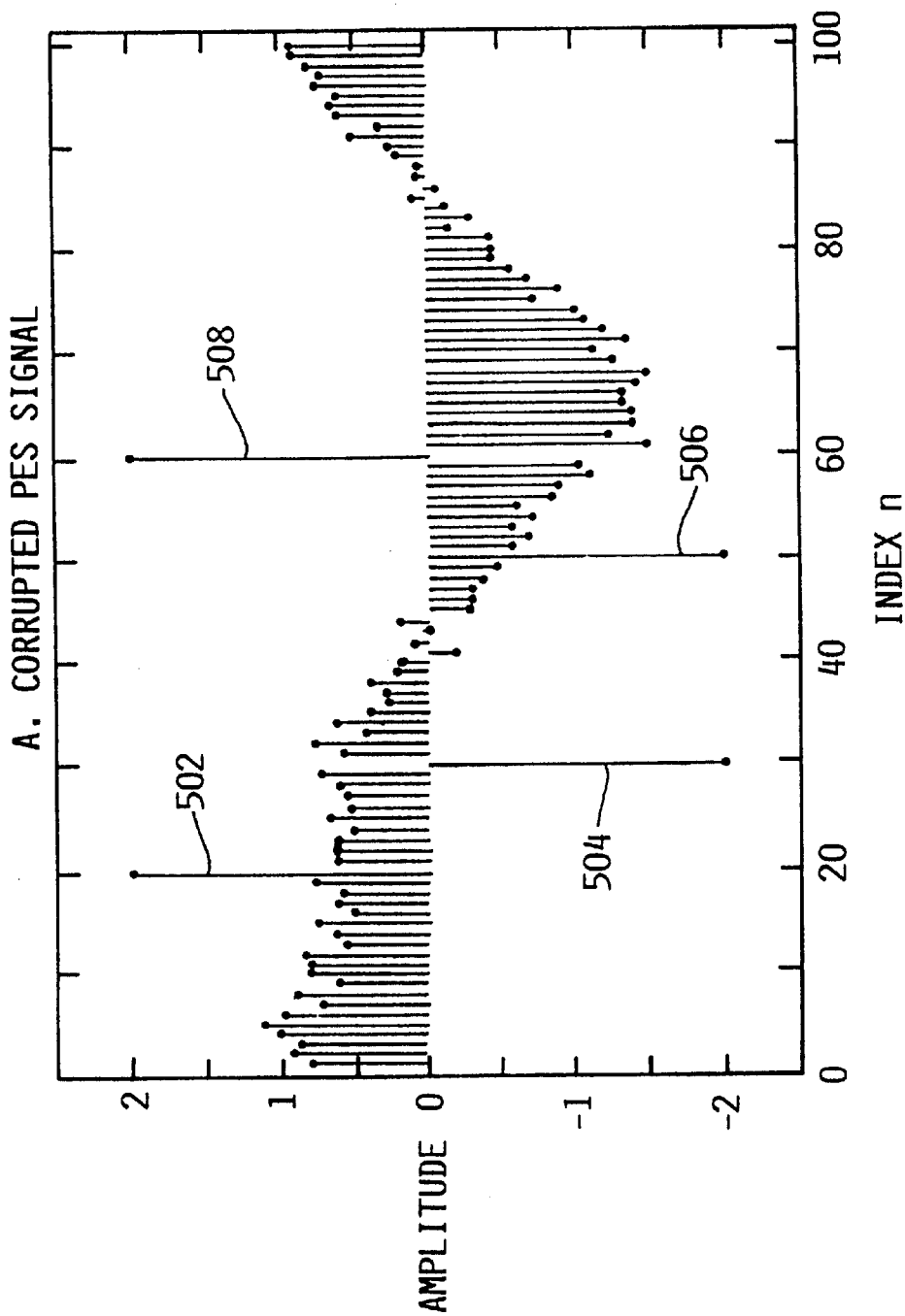
FIGS. 5A–5D are graphs illustrating the enhanced filtering of the position error signal (PES) that can be achieved by the invention.
Figure 5B:
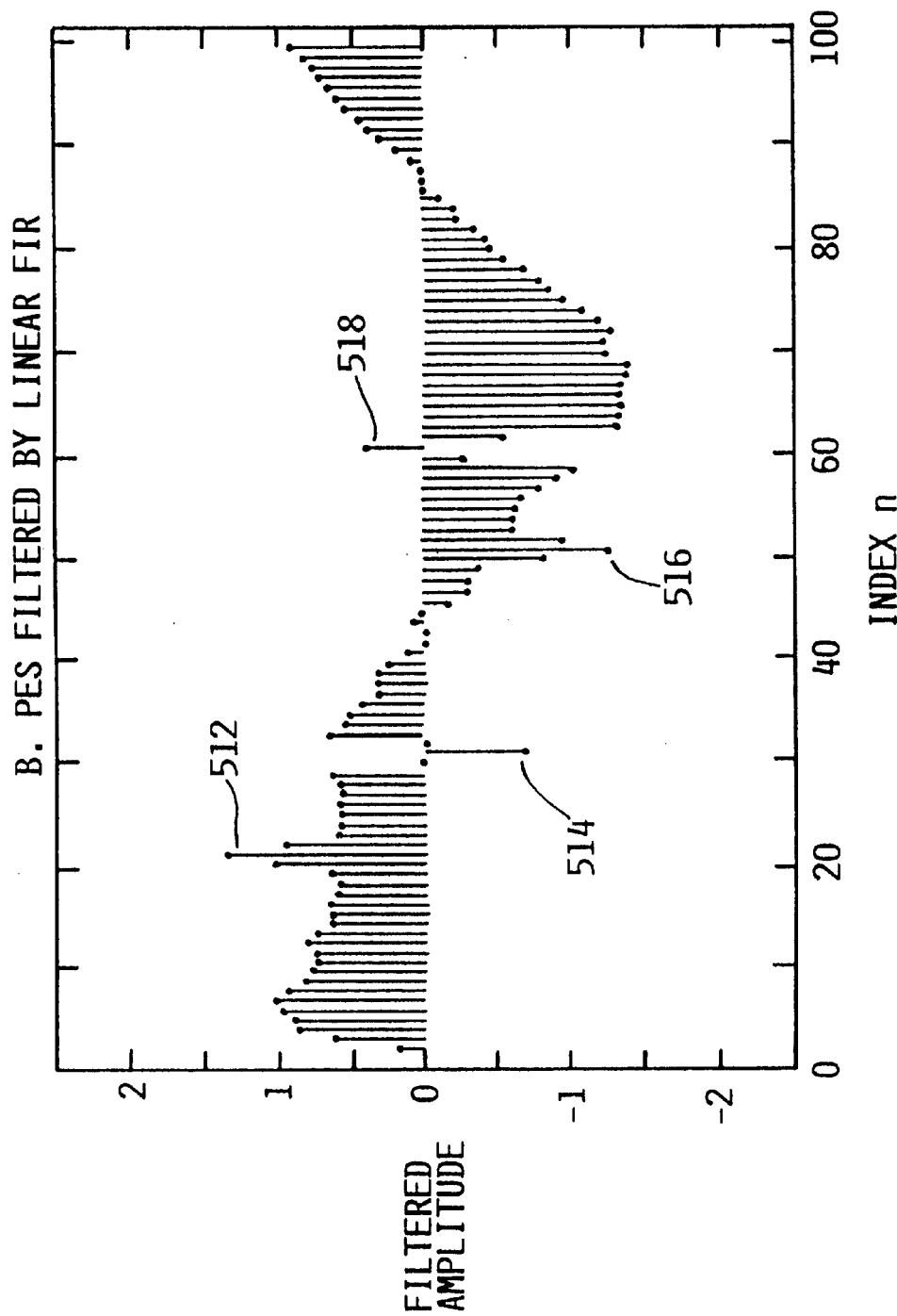
Figure 5C:
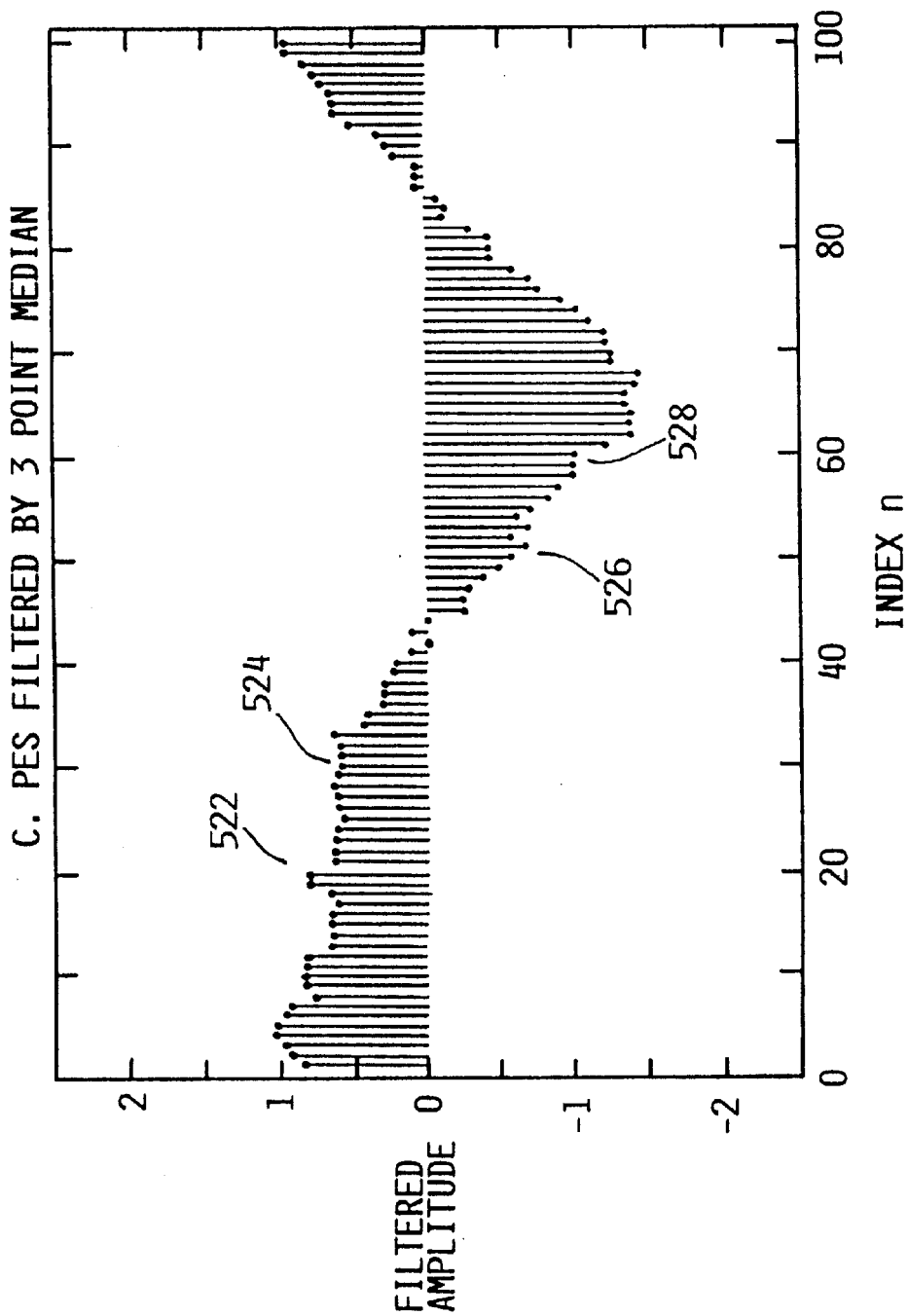
Figure 5D:
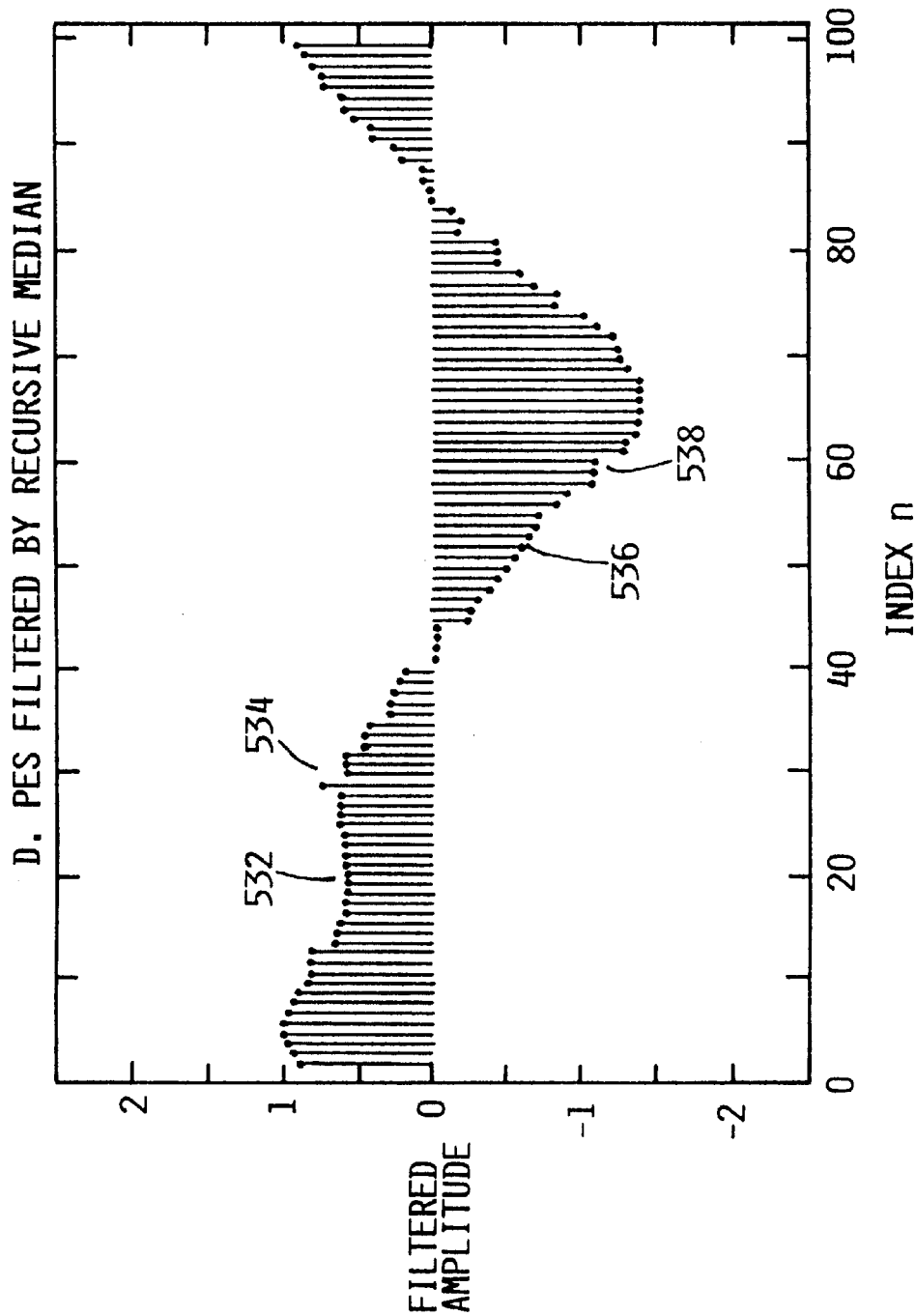

FIGS. 5A–5D are graphs illustrating the enhanced filtering of the position error signal (PES) that can be achieved by the invention. FIG. 5A shows a simulated noise contaminated position error signal sequence PES(n, h), n=1, 2, . . . , 100; taken from 100 servo sectors from an arbitrary track for one complete revolution of the disk. Notice the overall low frequency of the signal in FIG. 5A. This is the repeatable position error signal RPE(n, h), n=1, 2, . . . , 100. The high frequency variations make up the non-repeatable portion of the PES, and noise spikes 502, 504, 506 and 508 can be treated for being undesirable or "bad" PES noise of both the repeatable and non-repeatable kind. In FIG. 5B, a simple moving averaging simulation is shown. Here a linear, non-causal, 3-point finite impulse response (FIR) filter shows smearing of the impulsive PES noise as can be seen from 512, 514, 516 and 518. The FIR filter also causes a disruption in the overall smoothness of the filtered sequence. In FIGS. 5C and 5D, non-real-time (non-causal) 3-point median filtering is applied as described by non-recursive Equation (3) and recursive Equation (5), respectively. It can be seen that the four "bad" PES noise spikes have been effectively removed. This is alluded to in FIG. 5C by 522, 524, 526 and 528, while 532, 534, 536 and 538 indicate the corresponding events in FIG. 5D. The main difference between FIG. 5C and FIG. 5D is that there is more smoothness in FIG. 5D due to the use of recursive Equation (5) rather than non-recursive Equation (3).

The three non-real-time (non-causal) 3-point filter performances, i.e., the 3-point linear FIR filter of FIG. 5B, the 3-point non-recursive median filter of FIG. 5C, and the 3-point recursive median filter of FIG. 5D, are statistically compared in TABLE 1 below. Referring to TABLE 1, the all important standard deviation of the linear FIR filtered case is 63% of the unfiltered case, while the standard deviation is only about 16% for the non-recursive median filtered case and about 10% for the recursive median filtered case compared to the unfiltered case. Similar improvements can be seen from the differences in maximum and minimum columns as outlined in TABLE 1.

TABLE 1

| Filter Method | Mean | Std. Dev. | Max | Min |
| --- | --- | --- | --- | --- |
| No filtering | −0.018 | 0.490 | 2.733 | −3.256 |
| 3-point linear FIR filter | −0.008 | 0.309 | 1.247 | −1.574 |
| 3-point non-recursive median filter | −0.015 | 0.077 | 0.161 | −0.306 |
| 3-point recursive median filter | −0.007 | 0.051 | 0.153 | −0.205 |

Note that the statistics of the filtered values obtained in TABLE 1 where all simulated from non-real-time (non-causal) and not from real-time filters. In order to physically realize a real-time (causal) filter according to the invention with a minimum amount of phase lag, one must use the feedforward generator value $\overline{RPE}$(n+1, h) as a future sampled value. For example, simulation shows that the use of the real-time (causal) algorithm in Equation (7) will yield very similar results to the results obtained in FIG. 5D.

In the general discussion above about median filters, it was pointed out that one of their most valuable functional properties was the ability to eliminate impulsive noise from a signal. For better understanding of the invention, it is important to note that heretofore the ability of a median filter to eliminate successive impulses has been related to the length (2M+1) of the median filter. A (2M +1)-point median filter can eliminate up to M successive impulses, but if there are more than M successive impulses they will all pass unaltered through the filter. However, the 3-point recursive median filter 241 shown in FIG. 2 and given by Equation (7) will eliminate any length of consecutive PES noise impulses. This is because it uses the feedforward-generated sample $\overline{RPE}$(n+1, h) as a future value. The ability of the invention to eliminate any length of consecutive PES noise impulses is a major advantage over the prior art. In hard disk drives the majority of "bad" (impulsive) PES occur as singles, but occasionally there are two and less frequently more than two consecutive "bad" position error noise spikes for a given head h on an arbitrary track.

In the actual case where many consecutive PES impulses are present, there is a likelihood that there is a malfunction in the generation of position error signals and this event must be reported to the system controller 113. The PES monitor 274 shown in FIG. 2 checks sequentially the magnitude of the measured PES(n, h) and compares it to an allowable threshold E. If several successive samples of measured PES(n, h) exceed the absolute value condition |PES(n, h)|>E, then the PES monitor 274 will output a signal (g) on the line 276 to warn the system controller 113 about an undesirable event. The system controller 113 would then communicate the condition to the host for appropriate action.

It should also be observed that the real-time implementation technique used in Equation (7) can be used with linear finite impulse response (FIR) filters like the non-recursive moving average filter employed in FIG. 5B as shown in Equation (8) below $$y(n, h) = \tfrac{1}{3}[PES(n-1, h) + PES(n, h) + \overline{RPE}(n+1, h)], n=1, 2, \ldots, N \quad (8)$$

where y(n, h) is the filter output. The real-time implementation technique used in Equation (7) can also be used with infinite impulse response (IIR) filters, like a notch or low-pass filters. A simple second order IIR filter implementation is shown in Equation (9) below $$y(n, h) = b_{-1}\overline{RPE}(n+1, h) + b_0 PES(n, h) + b_1 PES(n-1, h) - a_1 y(n-1, h) - a_2 y(n-2, h), n=1,2, \ldots, N \quad (9)$$

where $b_{-1}, b_0, b_1, a_1, a_2$ are digital coefficients and y(n−1), y(n−2) are previous IIR filter outputs.

The algorithms in Equations (7), (8), and (9) are implementable as real-time filters. They are predicated on applications where the sensor signal can be separated into a repeatable (periodic) and a non-repeatable (non-periodic) component as shown in
Equation (10) below $$PES(n, h) = NRPE(n, h) + RPE(n, h), n=1, 2, \ldots, N \quad (10)$$

where the repeatable signal sequence RPE(n, h), n=1,2, . . . ,N can be averaged and smoothed into the repeatable sequence $\overline{RPE}$(n, h), n=1,2, . . . ,N. This method is ideal for rotating mechanical applications, like disk drives, compact disk (CD), CD-ROMs, and the like, where individual pre-measured and pre-calculated values of $\overline{RPE}$(n,h), n=1,2, . . . ,N are easily obtainable and can be stored in the feedforward generator 248. The measured sensor signals do not necessarily have to be position error, but could be velocity and/or acceleration error.

Figure 6:
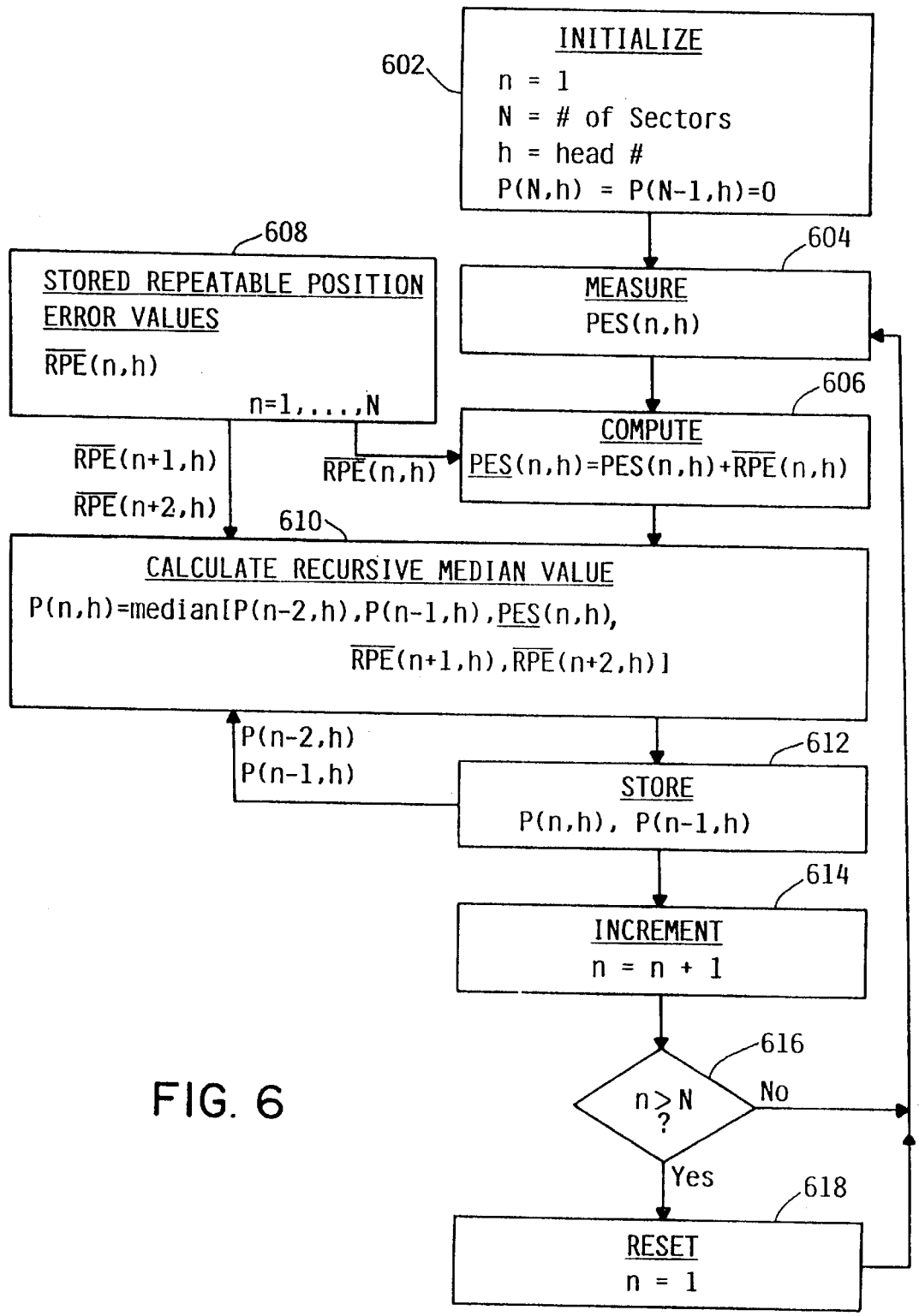
FIG. 6 is a flow chart wherein the filtered position error signal (PES) having zero phase shift is computed using a real-time 5-point recursive median filter according to an embodiment of the invention.

Referring now to FIG. 6, in addition to FIG. 2, a method according to another embodiment of the invention will be described. FIG. 6 is a flow chart wherein the filtered position error signal (PES) having zero phase shift is computed using a real-time 5-point recursive median filter. Using a 5-point recursive median filter will yield more filter smoothing than a 3-point median filter. This 5-point filter, described by the algorithm in Equation (11) below, can eliminate any number of consecutive impulses. This was also the case for the 3-point recursive median filter defined by Equation (7). Assume first that head h has been selected and the actuator has accessed a certain track. The process starts in block 602 by initializing the process by setting n=1, N equal to the total number of servo sectors, h equal to the head number, and the "previous" 5-point recursive median filter values P(N−1, h)=P(N, h)=0. In block 604 the position error signal PES(n, h) is measured. At block 606, the composite $\underline{PES}$(n, h)=PES (n, h)+$\overline{RPE}$(n, h) is calculated in the adder 238. Then the 5-point recursive median filter output value P(n, h) is computed in block 610 from the algorithm $$P(\underline{n,\ h})=\text{median}\ [P(n-2,\ h),\ P(n-1,\ h),\ \underline{PES}(n,\ h),\ \overline{RPE}(n+1,\ h),\ \overline{RPE}(n+2,\ h)],\ n\ 32\ 1,2,\ldots,N \quad (11)$$

where P(n−2, h), P(n−1, h) are the previous recursive median output values for head h stored in the memory/delay 243 at block 612, and RPE(n+1, h), RPE(n+2, h) are obtained in block 608 from the storage memory of the feedforward generator 248. The computed recursive 5-point median filter output value P(n, h) is then inputted to the servo compensator 252. The recursive median filter output value P(n, h) is also stored in the memory/delay 243 at block 612 together with the previous P(n−1, h) to be used in the 5-point median filtering of the next sample. The index n is incremented by one in block 614, and n is compared to the total number of servo sectors N in decision block 616. If n≦N the process is repeated from block 604 without resetting n, and if n>N then n is reset to 1 in block 618 and the process is repeated from block 604.

As part of the invention, the 3-point recursive median filter implementation described in connection with FIG. 4 and the 5-point recursive median filter implementation described in connection with FIG. 6 may be incorporated into an error recovery system that monitors the presence of data errors. If a data error is present and it is determined that the cause of error is due to two or more consecutive PES error spikes that force the transducer head off track, then a special recovery mode is initiated. This special recovery mode will first invoke a 5-point recursive median filter and try to read the data again, if unsuccessful in recovering the data, it might try a 7-point recursive median filter, and so on.

While the invention here has been described with reference to the details of the illustrated embodiments, these details are not intended to limit the scope of the invention as defined in the appended claims.

What is claimed is:

1. An apparatus for real-time filtering of at least one of a position error signal, a velocity error signal and an acceleration error signal in a device having a rotating body and a sensor that senses at least one of the position, velocity and acceleration of the rotating body, comprising:

a first input receiving at least one of a position error signal for a present servo sector index, velocity error signal for a present servo sector index, and an acceleration error signal for a present servo sector index;

a second input receiving at least one of a future repeatable position error for a future servo sector index, a future repeatable velocity error for a future servo sector index, and a future repeatable acceleration error for a future servo sector index, the future servo sector index corresponding with a servo sector on the rotating body sensed by said sensor subsequent to a servo sector corresponding with the present servo sector index, and being different than that of the servo sector corresponding with the present servo sector index; and an output providing at least one of a filtered position error signal for the present servo sector index, a filtered velocity error signal for the present servo sector index, and a filtered acceleration error signal for the present servo sector index based respectively on the position error signal for the present servo sector index and the future repeatable position error for the future servo sector index, the velocity error signal for the present servo sector index and the future velocity position error for the future servo sector index, and the acceleration error signal for the present servo sector index and the future repeatable acceleration error for the future servo sector index.

2. The apparatus for real-time filtering of at least one of a position error signal, a velocity error signal and an acceleration error signal as recited in claim 1, further comprising:

a third input receiving at least one of a previous recursive median output for a past servo sector index, the past servo sector index corresponding with a servo sector on the rotating body sensed by the sensor prior to the servo sector corresponding with the present servo sector index; and a recursive median filter calculating at least one of the filtered position error signal for the present servo sector index, the filtered velocity error signal for the present servo sector index, and the filtered acceleration error signal for the present servo sector index, respectively, by determining the median of the previous recursive median output for the past servo sector index, the position error signal for the present servo sector index, and the future repeatable position error for the future servo sector index, the median of the previous recursive median output for the past servo sector index, the velocity error signal for the present servo sector index, and the future repeatable velocity error for the future servo sector index, and the median of the previous recursive median output for the past servo sector index, the acceleration error signal for the present servo sector index, and the future repeatable acceleration error for the future servo sector index.

* * * * *